Dec. 12, 1967  R. BRATSCHI  3,357,620
APPARATUS FOR WELDING OF TIME-INDICATING SIGNS ONTO A SHEET
FORMING THE DIAL OF A TIMEPIECE
Filed March 20, 1964

INVENTOR.
ROBERT BRATSCHI
BY *Kenwood Ross*

ATTORNEY

United States Patent Office 3,357,620
Patented Dec. 12, 1967

3,357,620
APPARATUS FOR WELDING OF TIME-INDICATING SIGNS ONTO A SHEET FORMING THE DIAL OF A TIMEPIECE
Robert Bratschi, Bienne, Switzerland, assignor, by mesne assignments, to Jean Nydegger, Macolin, Bern, Switzerland
Filed Mar. 20, 1964, Ser. No. 353,551
Claims priority, application Switzerland, Apr. 8, 1963, 4,447/63
2 Claims. (Cl. 228—1)

The present invention has as its object the provision of apparatus for the welding, by means of ultrasonics, of time-indicating signs in the finished state, onto the dial of a timepiece, comprising a sonotrode, active or passive, which presents at least one indentation designed to receive the sign to be welded on.

As is known, in ultrasonic welding, the metals to be joined are placed between a pair of welding tips, one being the active or driving sonotrode, and the other being the passive or reflecting sonotrode. While clamped, ultrasonic energy is introduced through the active sonotrode, thereby introducing elastic vibratory energy into the area of the joint, with a resultant weld or bond being formed between the two metals.

It has been established, during ultrasonic welding of signs onto timepiece dials, in particular during the welding of completed signs which necessitate sonotrodes with polished indentations into which the said signs are partially receivable, that the sonotrodes deteriorate very rapidly. This deterioration is due to the fact that it is impossible to interrupt the welding operation at the exact instant when the weld is complete. Relative motion between the sonotrodes is still realized even though the parts being welded, are soon joined so as to tend to prevent this relative motion, thus damaging the sonotrodes.

The aim of the present invention is to overcome this disadvantage.

The apparatus employed is characterised by the fact that the passive sonotrode is made, at least in part, of a supple and compressible material which is deformed in such a manner as to follow, at least partially, the vibratory movements of the active sonotrode, when the forces exerted on it exceed a certain value, in particular at the end of the welding operation.

The drawing represents, by way of example, three means for carrying out the object of the invention.

Figure 1:
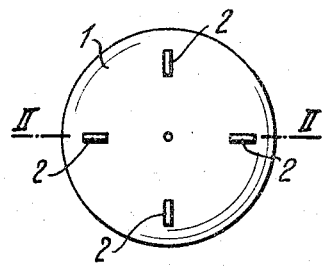
FIG. 1 is a view in top plan of a timepiece dial.

The timepiece dial 1 is provided with four horological signs 2 disposed at 3, 6, 9 and 12 o'clock respectively on the face of the dial. The signs are welded onto dial 1 by the application of ultrasonics.

For welding purposes, the dial is mounted on a passive sonotrode comprised of a metallic support 3 and a shock-absorbing cushion 4 of soft and compressible material, rubber for example, which serves as an intermediary between support 3 and a table 5 upon which the passive sonotrode rests. A central bolt 6 ensures the correct centering of cushion 4, support 3, and dial 1. The active sonotrode 7, which is mounted on an ultrasonic transducer 8, is provided with four indentations 9 which are internally polished and into which are partially inserted the signs 2 in the finished state, that is polished, and if necessary, metallised.

The vibratory movements produced by the transducer 8 at an ultrasonic frequency, follow in directions perpendicular to the horizontal plane of table 5, as shown by the arrow 10. Owing to the presence of shock-absorbing cushion 4 between support 3 and table 5, the active and passive sonotrodes do not deteriorate, even when and if the welding operation is not terminated at the precise moment when the weld is completed.

Figure 3:
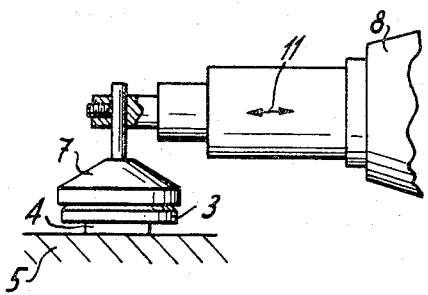
FIG. 3 is a view in side elevation of a second means for carrying out the welding operation.

In the method shown in FIG. 3, the apparatus comprises elements which are identical with those of the above-described first method, that is, a passive sonotrode comprising a support 3 and a shock-absorbing cushion 4, and an active sonotrode 7 which is fixed to an ultrasonic transducer 8. The difference between these two methods of practising the invention lies in the fact that, in the latter method, the transducer is arranged with respect to sonotrode 7 in such a position that the vibratory motions, as shown by the arrow 11, are parallel to the horizontal plane of table 5 and not perpendicular thereto, as before.

Because of shock-absorbing cushion 4, support 3 is allowed, when the weld is completed and in consequence when the forces exerted on the passive sonotrode by the active sonotrode exceed a given value, to follow the displacements of the active sonotrode, thus avoiding deterioration of the sonotrodes.

Figure 2:
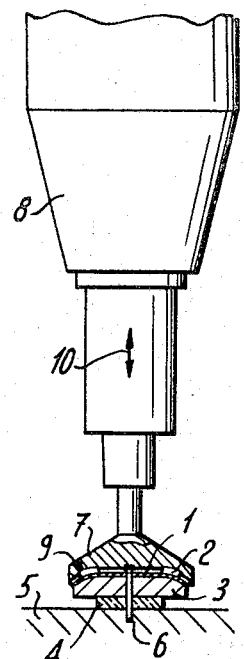
FIG. 2 is a view in side elevation of a first means for carrying out the welding operation, with the dial of FIG. 1 being shown in section along line II—II of that figure, but on a reduced scale.
Figure 4:
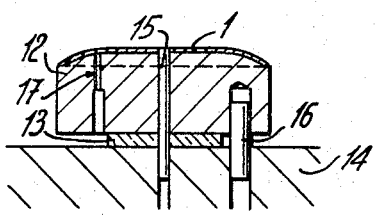
FIG. 4 is a view in section of a variant means for carrying out the welding operation.

In a variant form of method shown in FIG. 4, a passive sonotrode, similar to that of FIGS. 2 and 3, comprises a support 12 and a shock-absorbing cushion 13 interposed between this support and the table 14. A central bolt 15 ensures correct centering, in a manner similar to bolt 6 above, while a lateral bolt 16, engaging between support 12 and table 14 ensures a correct orientation of the support with respect to the table. Support 12 additionally may be pierced by holes 17 so as to accommodate the feet of the dial, if desired.

Such passive sonotrode can be used equally well in an apparatus of the type shown in FIG. 2, where ultrasonic vibrations are produced in directions perpendicular to the general plane of the surfaces to be welded, or in an apparatus of the type shown in FIG. 3, where ultrasonic vibrations are produced in directions parallel to the general plane of the surfaces to be welded. It is to be noted that, even in this latter case, displacements of support 12, made possible by shock-absorbing cushion 13, and produced when the weld is complete, are not prevented by bolts 15 and 16, play being allowed between these bolts and the diameters of the openings through which they pass being greater than the amplitude of the ultrasonic vibrations.

The desired results are obtained even if the sonotrodes are formed of a relatively soft material, such as aluminum or plastic.

One can even envisage the case where one of the electrodes is entirely made of an elastic material, instead of being formed from two parts, one rigid and the other elastic, as in the examples described and drawn.

What I claim is:

1. In an ultrasonic welding apparatus for welding a finished time-indicating sign to the surface of a timepiece dial, the improvement comprising, an active sonotrode having an indentation for receiving the to-be-welded sign, and a passive sonotrode, said passive sonotrode being at least partially formed from a compressible material having a capacity for deforming in conformity to the vibratory movements of said active sonotrode as the exerted forces exceed a certain predetermined value.

2. In an ultrasonic welding apparatus for welding a finished time-indicating sign to the surface of a timepiece dial, the improvement comprising, a fixed support, an active sonotrode, a passive sonotrode bearing on said support, said active sonotrode being provided with an indentation for receiving a to-be-welded sign, said passive sonotrode comprising a metallic element for receiving the to-be-welded sign and a compressible shock-absorbing cushion element, the cushion element of said passive sonotrode being disposed intermediate the metallic element of said passive sonotrode and support.

References Cited

UNITED STATES PATENTS

| 3,053,124 | 9/1962 | Balamuth et al. | 228—1 |
| 3,047,942 | 8/1962 | Schneider et al. | 29—177 |

JOHN F. CAMPBELL, *Primary Examiner.*

MARTIN L. FAIGUS, *Assistant Examiner.*